United States Patent [19]
Ohno et al.

[11] Patent Number: 5,863,355
[45] Date of Patent: Jan. 26, 1999

[54] FLUX FOR SOLDERING ELECTRONIC COMPONENTS ON CIRCUIT SUBSTRATES, AND MOUNTED OR UNMOUNTED CIRCUIT SUBSTRATE

[75] Inventors: Takao Ohno; Shouichi Saito; Satoshi Shinohara; Kazuyuki Takakuwa, all of Saitama-ken, Japan

[73] Assignee: Tamura Kaken Co., Ltd., Japan

[21] Appl. No.: 606,772

[22] Filed: Feb. 27, 1996

[30] Foreign Application Priority Data

Mar. 30, 1995 [JP] Japan ................................ 7-078415

[51] Int. Cl.$^6$ ...................................... H05K 3/06
[52] U.S. Cl. ................... 148/26; 148/23; 148/24; 148/25; 106/1.13; 228/214; 228/223; 228/224
[58] Field of Search ................. 106/1.13; 228/180.1, 228/214, 223, 224; 148/23, 24, 25

[56] References Cited

U.S. PATENT DOCUMENTS 4,290,824  9/1981  Cole ............................. 148/23
5,417,771  5/1995  Arita et al. ..................... 148/23

*Primary Examiner*—Patrick Ryan
*Assistant Examiner*—M. Alexandra Elve
*Attorney, Agent, or Firm*—King and Schickli

[57] ABSTRACT

The invention provides a soldering flux for mounting circuit substrates, which is free from any organic solvent attributable to air pollution and dispenses with any washing step. The soldering flux is obtained by dissolving a rosin modified by an unsaturated organic acid according to the Diels-Alder reaction in an aqueous solvent. A volatile basic agent may further be contained in the flux.

8 Claims, No Drawings

FLUX FOR SOLDERING ELECTRONIC COMPONENTS ON CIRCUIT SUBSTRATES, AND MOUNTED OR UNMOUNTED CIRCUIT SUBSTRATE

BACKGROUND OF THE INVENTION

1. Field of the Invention

The present invention relates to an aqueous solvent type of flux used for soldering electronic components on a circuit substrate, and a circuit substrate having a flux residue. The present invention is also concerned with a mounted or unmounted circuit substrate. In this present disclosure, the "mounted or unmounted" circuit substrate is understood to refer to a circuit substrate on which electronic components are or are not mounted.

2. Prior Art

A circuit substrate, for instance, a printed circuit substrate is fabricated by forming a circuit interconnecting pattern on a copper-clad laminate, for example. One circuit unit can then be formed by mounting electronic components on the circuit substrate. The electronic components such as capacitors and resistors are connected and fixed by soldering to a copper foil land, i.e., a soldering land of the circuit interconnecting pattern.

The soldering of electronic components on a printed circuit substrate is achieved by a so-called flow soldering process wherein a chip form of electronic component having electrodes at both its ends is provisionally held at a given position of the printed circuit substrate such that the electrodes are located at a soldering land, and the provisionally held electronic component is allowed to come in contact with a flow of molten solder, so that the electronic component can be soldered on the soldering land, or a so called reflow soldering process wherein while the electrodes of an electronic component are located at a soldering land precoated with solder paste, as mentioned just above, solder powders of the soldering paste are molten by heating, so that the electronic component can be soldered on the soldering land.

Regardless of whether the flow or the reflow soldering process is used, the electronic component is allowed to come in contact with a flow of molten solder or is coated with solder paste after a flux has been applied on the soldering land. By doing so, the oxidation of copper foils of the soldering land due to heat, etc., generated during soldering can be avoided to make soldering satisfactory. The soldering land of a printed circuit substrate is heated to 200° C. to 300° C. during soldering. If the soldering flux is applied on the soldering land to form flux coating thereon, then the flux film cuts off oxygen to prevent oxidation of the copper foils and reduces the oxides that have already occurred, so that the molten solder call be well wetted. This is true even when the surface of the soldering land is exposed or provided with a protecting film.

For such a flux, a rosin type of resin (hereinafter called the rosin) is often used. This flux is composed mainly of a rosin in and contains activators such as amine halides and organic acids as subordinate components, all dissolved in an alcohol solvent. For this alcohol solvent, an alcohol mixture composed mainly of isopropyl alcohol is generally used. One reason is that isopropyl alcohol is excellent to solve in the rosin and various activators. Another reason is that isopropyl alcohol, albeit having a relatively low boiling point, is higher in the permissible concentration for explosion in the air than other organic solvents, so that fire risk due to the volatilization of a solvent during flux production or flux coating can be substantially reduced. Still another reason is that isopropyl alcohol is inexpensive.

However, isopropyl alcohol is diffused in the air during flux coating, and so is a factor attributable to environmental pollution, for instance, photochemical smog. It is thus desired that the amount of isopropyl alcohol diffused in the air be reduced.

To do this, some water-soluble fluxes free from any volatile organic solvent have been developed. However, since the water-soluble substance used, for instance, is glycol ether, there are several problems. For example, if the flux is allowed to leave to be coated and soldered on the flux residue, the circuit may then be short-circuited because the resulting flux film is poor in insulating properties. To avoid this, the flux film must be washed off. This additional washing step leads to another problem, productivity drops.

In an effort to avoid this problem, refined rosin composed mainly of abietic acid is dissolved in water in the form of an ammonia salt or a salt of an amine, but the amount of the ammonia or amine used must be increased to be better solved. However, the wettability of the resultant flux residue by molten solder becomes worse and so has an adverse influence on the so-called solderability. For instance, solder is bridged across adjacent soldering lands (solder bridging), or an unsoldered area remains. Besides, the flux residue, because of containing a large amount of ammonia or the amine, is poor in electrical insulating properties and, hence, in reliability, because the circuit is often short-circuited and fails to function normally.

SUMMARY OF THE INVENTION

A first object of the present innrention is to provide a soldering flux for mounting circuit substrates, which enables the amount of an organic solvent dissolved in the air to be considerably reduced or substantially eliminated.

A second object of the present invention is to provide a soldering flux for mounting electronic components on circuit substrates, which can dispense with any washing of the resultant flux residue.

A third object of the present invention is to provide a soldering flux for mounting electronic components on circuit substrates, which has no adverse influence on solderability, inhibits corrosion of a soldering land, and is excellent in electrical insulating quality and reliability.

A fourth object of the present invention is to provide a soldering flux for mounting circuit substrates, which ensures high soldering efficiency and productivity.

A fifth object of the present invention is to provide an unmounted circuit substrate pre-coated with the above soldering flux for protecting a soldering land.

A sixth object of the present invention is to provide a mounted circuit substrate, which can be obtained with high productivity yet at low costs, while the reliability of circuit function is maintained.

According to the present invention, the objects mentioned above are achieved by the provision of a flux for soldering electronic parts on a circuit substrate, which contains 0.1 to 30% by weight of a rosin modified by an unsaturated organic acid according to the Diels-Alder reaction, and uses an aqueous solvent as a solvent.

Preferably, the soldering flux contains a volatile basic agent.

More preferably, the volatile basic agent is at least one compound selected from the group of ammonia, and an aliphatic amine, a hydrazine, a polyamine, an alkanolamine, a nitrogen atom-containing heterocyclic compound, an alicyclic amine and an aromatic amine represented by the following general formula [I]:

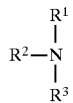

where $R^1$, $R^2$ and $R^3$, which may be identical with or different from each other, stand for a hydrogen atom or an alkyl group.

More preferably, the volatile basic agent has a boiling point of up to 200° C., and is contained in the soldering flux in an amount of 0.1 to 20% by weight.

Preferably, the aqueous solvent comprises water and a solvent soluble in water, with the amount of water being at least 50% by weight. More preferably, the aqueous solvent consists of water alone.

According to the present invention, there is also provided an unmounted circuit substrate in which a soldering land is coated with the above soldering flux.

According to the present invention, there is further provided a mounted circuit substrate on which electronic components are soldered using the above flux.

DETAILED DESCRIPTION OF THE INVENTION

By the "rosin modified by an unsaturated organic acid according to the Diels-Alder reaction" defined herein is meant a resin that is obtained by combining the rosin and/or the derivative rosin with the unsaturated organic acid according to the Diels-Alder reaction. The Diels-Alder reaction is also referred to as diene synthesis, whereby a compound having a double or triple bond is added to a compound having a conjugated double bond at the 1, 4-positions to form a six-membered hydroaromatic ring. Here, the former is the unsaturated organic acid while the latter is the rosin that is the reaction product as aimed.

For the rosin, a resin material capable of becoming a component for the Diels-Alder reaction may be used. A resin containing abietic acid and/or modified abietic acid as a main component, such as gum rosin, wood rosin, tall oil rosin and these modified resins may be used.

The unsaturated organic acid used, for instance, may include an aliphatic unsaturated monobasic acid such as acrylic acid, methacrylic acid or levulinic acid, an aliphatic unsaturated dibasic acid such as an α,β-unsaturated carboxylic acid exemplified by fumaric acid, maleic acid, maleic anhydride, itaconic acid, itaconic anhydride, citraconic acid or citraconic anhydride, and an unsaturated carboxylic acid including an aromatic ring such as cinnamic acid. Many other unsaturated organic acids may be used as well. These acids may be used alone or in combination of two or more.

The resin obtained by modifying the rosin by the unsaturated organic acid according to the Diels-Alder reaction can have an acid number or value larger than that of the starting rosin. A preferable acid number is at least 180. The resin, when it has too small an acid number, is less soluble in water even by using the basic agent to be described later.

In order that the modified resin functions well as the resin component for the flux residue, it should preferably have a softening point (as measured by the ring and ball method according to the Japanese Industrial Standards) of 60° to 150° C. for the flow soldering process, and of 70° to 150° C. for the reflow soldering process because an increased soldering temperature is applied. If the modified resin has a softening point lying in the above-defined ranges, it would not make solderability worse irrespective of whether it is used according to the flow soldering process or the reflow soldering process. At too low a softening point the resin provides a tacky flux residue, whereas at too high a softening point the ability of the resin to be forced aside by the molten solder becomes worse; so the wettability of the molten solder with respect to the soldering land may often become worse.

For the Diels-Alder reaction between the rosin and the unsaturated organic acid, for instance, a process known as a process for preparing strengthened rosin may be used, wherein the unsaturated organic acid is slowly added to the rosin substance in a molten state.

The rosin modified by the unsaturated organic acid should preferably be contained in the flux in an amount of 0.1 to 30% by weight. In too small an amount the rosin cannot function as a flux component. In too large an amount, on the other hand, not only does the rosin incur some considerable expense but also it provides a flux having a viscosity so increased that the flux cannot uniformly be applied on a printed circuit substrate. In addition, the resultant flux residue becomes too thick to be worse in the wettability of the molten solder with respect to the soldering land.

In the present disclosure, the wording "using an aqueous solvent as a solvent" is understood to mean that the solvent constituting the flux is an aqueous solvent. That is, the aqueous solvent refers to not only water alone but also a solvent mixture of water and an organic solvent soluble in water.

When the aqueous solvent consists of water alone, it is preferable that the above rosin modified by the unsaturated organic acid according to the Diels-Alder reaction is used in combination with the basic agent, and is dissolved therein in the form of a salt. In this case, if the modified rosin having a large acid number is used, the amount of the basic agent can be reduced.

It is most preferable that water alone is used as the flux solvent, because any organic solvent is not diffused in the air during flux coating. However, the solvent mixture comprising water and an organic solvent soluble in water, too, is acceptable. The reason is that a risk that the organic solvent reaches the critical concentration for explosion in the air is much more reduced than would be possible with a conventional organic solvent type flux. Even when the organic solvent is diffused from this solvent mixture in the air, its concentration is much lower than that at which photochemical smog takes place. Thus, the solvent mixture can introduce some improvement in currently available organic solvent type fluxes. To do this, however, the flux should preferably contain at least 50% by weight of water. Given that the flux contains 1 to 30% by weight of the above modified resin, 0.1 to 20% by weight of the basic agent and at least 50% by weight of water together with other components such as an activator, it is a matter of course that some limitation is placed on the content of the organic solvent.

The benefit of using the organic solvent is that, even when the flux contains a few % or less of such a solvent mixture containing water, it is often possible to increase the solubility of the above modified rosin and hence lower the viscosity of the flux, so making the ability of the flux to be coated better. Moreover, even when the amount of the basic agent for promoting the solubility of the above modified rosin in water is reduced, the solubility of the resin is scarcely, decreased. To add to this, this solvent mixture, when used at such a low concentration, offers little, if any, problem in connection with a release of the organic solvent during flux coating or production.

The water-soluble organic solvent used herein may have a solubility enough to be dissolved in the water used because, in some cases, the organic solvent is contained in the flux in an amount of a few % or less. Preferably used as this solvent are alcohol solvents, among which isopropyl alcohol is most preferable. These organic solvents may be used alone or in admixture.

In order that the above rosin modified by the unsaturated organic acid according to the Diels-Alder reaction be well dissolved in water alone, it is preferable to use the basic agent therewith, so, that the rosin can be dissolved in the water in the form of a salt. In view of resulting properties, preferably this basic agent should leave no residue in the flux residue after flux coating and soldering. For instance, preference is given to a socalled volatile basic agent having a boiling point of up to 200° C.

For instance, the basic agent may be at least one compound selected from the group consisting of ammonia, and an aliphatic amine, a hydrazine, a polyamine, an alkanolamine, a nitrogen atom-containing heterocyclic compound, an alicyclic amine and an aromatic amine represented by the above general formula [I].

More illustratively, an amine having a lower alkyl group such as ethylamine (b.p.: 38° C.) or triethylamine (b.p.: 89.7° C.) is mentioned for the aliphatic amine, ethylenediamine or diaminopropane for the polyamine, ethanolamine such as monoethanolamine for the alkanolamine, pyridine for the nitrogen atom-containing heterocyclic compound, piperidine or pipecoline for the alicyclic amine, and benzylamine for the aromatic amine.

Preferably, the flux contains 0.1 to 20% by weight of the basic agent. At too low a content the basic agent is less effective for increasing the solubility of the resin in water. At too high a content, on the other hand, the basic agent makes the insulating properties of the flux residue worse, makes a corrosive attack on the soldering land and so makes its conductivity worse, and lowers soldering strength.

If required or if desired, the flux of the present invention may further contain 1 to 5% by weight of activators for reducing the oxides of copper of the soldering land, for instance, amines, amine salts (organic or inorganic acid salts) mineral acid salts, e.g., hydrochloric or sulfuric acid salts of polyamine such as ethylenediamine, and amine such as cyclohexylamine or diethylamine), organic acids, and amino acids by way of example alone.

To prepare the flux of the present invention, the above rosin modified by the unsaturated organic acid according to the Diels-Alder reaction is slowly added under agitation to a mixture of water and the above basic agent to form a solution, and the activators are then added to the solution optionally together with co-agents such as other resins and plasticizers. The flux of the present invention may also be obtained by predissolving the above modified rosin in an organic solvent, dissolving the resulting solution in the solvent mixture comprising water and the basic agent, and then adding the required or desired components to the resulting solution. When the organic solvent is contained in the flux, the organic solvent is used as the solvent for the above modified rosin, and an additional amount of the organic solvent is used to make up for a deficiency. This makes it possible to improve the solubility of the above rosin in the solvent mixture comprising water and the basic agent. When it is desired to contain little or no organic solvent in the flux, it is preferable that the organic solvent is volatilized off when the above modified rosin is dissolved in the solvent mixture comprising water and the basic agent by agitation. In this case a volatile organic solvent may be used as the organic solvent.

The flux of the present invention may be coated on a printed circuit substrate as conventional, for instance, by known techniques such as roll coating, dipping, and spraying. Alternatively, use may be made of a coating technique wherein air is blown into the flux to foam it by bubbling and the resultant bubbles are deposited to a printed circuit substrate.

The thus coated and dried flux according to the present invention gets rid of water and the basic agent by volatilization, yielding a flux residue consisting of the above modified rosin and activator. The soldering flux of the present invention may be applied to either the flow soldering process or the reflow soldering process. Since the modified rosin basically possesses the nature of the rosin, the flux residue protects the soldering land against atmospheric oxygen to prevent oxidation of the surface copper of the soldering land until molten solder comes into contact therewith. Upon coming in contact with the molten solder, the flux residue is melted by the heat of the molten solder and forced aside by the molten solder so that the soldering land can be unveiled. Concurrently, the activator reduces copper oxides that may occur prior to flux coating or during soldering, so that the soldering land of metallic copper can be well wetted by the molten solder.

When the basic agent used is a volatile one, the modified rosin is insoluble in water after soldering, because the basic agent has already been removed by volatilization. Thus, the hydrophilic resin is converted into hydrophobic resin, so that the surface insulating properties and, hence, reliability of the mounted circuit substrate can be well maintained without short-circuiting or other defects.

The flux of the present invention may be coated and then soldering may be done on the flux residue on a printed circuit substrate in this way. Thus, the present invention can provide a mounted circuit substrate with the flux residue according to the present invention remaining coated on it without being subjected to washing.

The flux of the present invention may be coated on a printed circuit substrate on which a circuit interconnecting pattern has been formed by etching a copper-clad laminate, or such a patterned circuit substrate which have been further softetched on the surface for copper oxide removal, so that it can act as a protecting film for protecting the resultant pattern against oxidation until soldering is to be done. In other words, the present invention provides a printed circuit substrate including such a protecting film.

The present invention also provides an "unmounted or mounted circuit substrate including a film that is obtained by coating the circuit substrate with a flux obtained by dissolving a rosin modified by an unsaturated organic acid according to the Diels-Alder reaction in water by a volatile basic agent and removing the basic agent from the resultant coating film".

The modified rosin can have a large acid number by the Diels-Alder reaction between the starting rosin and the unsaturated organic acid. It is the large acid number that enables the proportion of salt-forming sites reacted with the basic agent contained per molecule to be increased. This salt makes the modified rosin hydrophilic and so enables the solubility of the modified rosin in water to be so increased that it can be dissolved in water alone.

The principle is illustrated by the following reaction scheme wherein the R—COOH represented by (a) is an acid group, for instance, unmodified or modified abietic acid, (b) a basic agent, and (c) a reaction product, i.e., a salt that makes the acid group soluble in water.

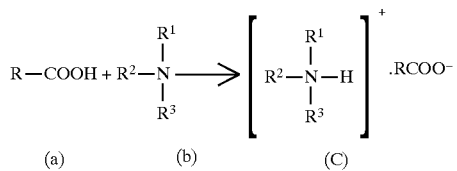

(a)       (b)       (C)

Here $R^1$, $R^2$ and $R^3$, which may be identical with or different form each other, represent a hydrogen atom or an alkyl group.

The basic agent, when it is a volatile one, is volatilized off upon removal of water, so that the salt forming sites are made relatively hydrophobic and hence cannot be dissolved in water alone. There is no need of washing off or otherwise removing the hydrophobic film, because its insulating properties are kept intact.

EXAMPLE

The present invention will now be explained at great length with reference to some examples and comparative examples by way of illustration but not by way of limitation.

The flux of the present invention may be used as in the case of conventional fluxes, and coated on a printed circuit substrate to form a flux coating thereon. Examples of the flux and of circuit substrates with flux coatings formed thereon are given below.

Some rosins modified by the unsaturated organic acid according to the Diels-Alder reaction were first prepared as follows. It is here to be noted that the softening points mentioned below were found by the JIS ring and ball method.

(i) Preparation of Rosin Modified by Acrylic Acid

The reaction between acrylic acid (0.8 moles) and rosin (1 mole) having an acid number of 170 and a softening point of 70° C. was carried out at 250° C. for 8 hours by adding the former drop wise under agitation to the latter.

The obtained rosin resin modified by acrylic acid was found to have an acid number of 260 and a softening point of 130° C.

(ii) Preparation of Rosin Modified by Maleic Acid

The reaction between rosin (4 moles) having an acid number of 170 and a softening point of 70° C. and maleic anhydride (1 mole) was carried out by heating them at 200° C. for 8 hours.

The obtained rosin modified by maleic acid was found to have an acid number of 289 and a softening point of 135° C.

(iii) Preparation of Rosin Modified by Levulinic Acid

The reaction between rosin (4 moles) having an acid number of 170 and a softening point of 70° C. and levulinic acid (2 moles) was carried out by heating them at 200° C. for 8 hours.

The obtained rosin modified by levulinic acid was found to have an acid number of 270 and a softening point of 129° C.

The thus obtained modified rosin are 90 to 118 or 52.9 to 70% higher in acid number than the starting rosins. Given that the acid number is at least 180 as mentioned above, the "rosin modified by an unsaturated organic acid according to the Diels-Alder reaction" may be a "resin that is modified by an unsaturated organic acid according to the Diels-Alder reaction and has an acid number of 180 to 300" or a "resin that is modified by an unsaturated organic acid according to the Diels-Alder reaction and has an acid number at least 5.8% (corresponding to the acid number of 180) higher, or at least 50% higher, or 50% to 75% higher, than that of starting rosin".

Example 1

Water (929 g) placed in a 2-liter vessel was agitated with (a 28% aqueous solution form of) ammonia water at the proportion mentioned just below. While the agitation was continued, the rosin modified by acrylic acid, obtained as mentioned at the above (i), was slowly added to the aqueous solution. After a continued 60-minute agitation, an activator or diethylamine hydrochloride was added to the solution, and the solution was uniformly stirred to form a flux.

Rosin modified by acrylic acid (obtained as mentioned above and as solid matter) 5% by weight Ammonia water (28% aqueous solution) 2% by weight Diethylamine hydrochloride 0.1% by weight Water 92.9% by weight Total 100.0% by weight With the thus obtained flux, the following tests were made.

(a) Solubility Test

The as-prepared flux was placed in a glass tube for visual observation of its solubility. The result is given in TABLE 2.

In TABLE 2, O shows that the flux is transparent and soluble, Δ that the flux is slightly cloudy, X that the flux is insoluble, and - that the flux is too insoluble for testing.

(b) Soldering Test

A 7 mm×15 mm×0.2 mm copper plate was dipped at 20°±1° C. for 60 seconds in an aqueous solution containing 11% by weight of sulfuric acid and 3.8% by weight of hydrogen peroxide for soft etching. Afterwards, the copper plate was taken out of the aqueous solution and then washed with deionized water for 30 seconds. Following this, the copper plate was washed with isopropyl alcohol and then ethyl acetate, well dehydrated on the surface, and air-dried.

The above flux was coated and dried on the thus treated copper plate. The copper plate with the flux residue formed on it was tested for a soldered spreading according to JIS-Z-3197.

(c) Copper Plate Corrosion Test

The copper plate with the flux residue formed on it, obtained at the above (b), was tested according to JIS-Z-3197.

(d) Insulation Resistance Test

The copper plate with the flux residue formed on it, obtained at the above (b), was tested according to JIS-Z-3197.

(e) Damp Heat Test At Applied Voltage

The copper plate with the flux residue formed on it, obtained at the above (b), was tested according to JIS-Z-3197.

Examples 2–12

Fluxes were prepared following Example 1 with the exception that the components were used at the proportions shown in TABLE 1, and were tested following Example 1. The results are shown in TABLE 2.

It is here to be noted that the rosins modified by maleic and levulinic acids were prepared according to the above (ii) and (iii).

Example 13

(Exemplary Unmounted Circuit Substrate)

The copper plate coated with the flux residue, used in the above test (b), can be regarded as being an unmounted printed circuit substrate including a protecting film on the soldering land in view of a function of protecting the surface of copper, and so can be taken as being tantamount to an example of the unmounted circuit substrate according to the present invention.

Example 14

(Exemplary Mounted Circuit Substrate)

In view of the results of the above insulating resistance (c) and damp heat (d) tests, the copper with the flux residue formed on it, used in the above test (b), can be regarded as being a mounted printed circuit substrate including an insulting film on the soldering land, and so can be taken as being tantamount to an example of the mounted circuit substrate according to the present invention.

Comparative Examples 1–3

Comparative fluxes were prepared following Example 1 with the exception that the components were used at the proportions specified in TABLE 1, and then tested according to Example 1. The results are shown in TABLE 2.

TABLE 1

| | | Examples | | | | | | | | | | | | Comp. Ex. | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 1 | 2 | 3 |
| Modified Resin | Acrylic Acid | 5 | 10 | 15 | | | 10 | 10 | 10 | 10 | 10 | 10 | 10 | | 10 | |
| Modified Resin | Maleic Acid | | | | 10 | | | | | | | | | | | |
| Modified Resin | Levulinic | | | | | 10 | | | | | | | | | | |
| | Refined Resin | | | | | | | | | | | | | 10 | | 10 |
| Activato | Diethylamine Hydrochloride | 0.1 | 0.1 | 0.1 | 0.1 | 0.1 | 0.1 | 0.1 | 0.1 | 0.1 | 0.1 | 0.1 | 0.1 | 0.1 | 0.1 | 0.1 |
| Basic Agent | Ammonia | 0.5 | 1.0 | 1.6 | 1.0 | 1.0 | 1.0 | 3.0 | 5.0 | | | | | 5.0 | | |
| Basic Agent | Ethylamine | | | | | | | | | 3.0 | | | | | | |
| Basic Agent | Triethylamine | | | | | | | | | | 3.0 | | | | | |
| Basic Agent | Monoethanolamine | | | | | | | | | | | 3.0 | | | | |
| Basic Agent | Piperidine | | | | | | | | | | | | 3.0 | | | |
| Solvent | Water | 94.4 | 88.9 | 83.4 | 88.9 | 88.9 | 98.9 | 96.9 | 94.9 | 96.9 | 96.9 | 96.9 | 96.9 | 88.9 | 89.9 | |
| Solvent | Isopropyl Alcohol | | | | | | | | | | | | | | | 88.9 |
| Total (parts by weight) | | 100 | 100 | 100 | 100 | 100 | 110 | 110 | 110 | 110 | 110 | 110 | 110 | 104 | 100 | 99 |

TABLE 2

| | Solubility | Soldered Area (%) | Corrosion of Copper Plate | Electrical Insulation Resistance | Resistance after the application of voltage | Corrosion after the application of voltage |
|---|---|---|---|---|---|---|
| Examples | | | | | | |
| 1 | ○ | 90 | Acceptable | $5 \times 10^{13}$ | $4 \times 10^{12}$ | Acceptable |
| 2 | ○ | 91 | Acceptable | $5 \times 10^{13}$ | $3 \times 10^{12}$ | Acceptable |
| 3 | ○ | 91 | Acceptable | $3 \times 10^{13}$ | $1 \times 10^{12}$ | Acceptable |
| 4 | ○ | 90 | Acceptable | $4 \times 10^{13}$ | $2 \times 10^{12}$ | Acceptable |
| 5 | ○ | 91 | Acceptable | $4 \times 10^{13}$ | $2 \times 10^{12}$ | Acceptable |
| 6 | ○ | 91 | Acceptable | $5 \times 10^{13}$ | $4 \times 10^{12}$ | Acceptable |
| 7 | ○ | 91 | Acceptable | $4 \times 10^{13}$ | $2 \times 10^{12}$ | Acceptable |
| 8 | ○ | 91 | Acceptable | $5 \times 10^{13}$ | $2 \times 10^{12}$ | Acceptable |
| 9 | ○ | 90 | Acceptable | $4 \times 10^{13}$ | $3 \times 10^{12}$ | Acceptable |
| 10 | ○ | 90 | Acceptable | $4 \times 10^{13}$ | $2 \times 10^{12}$ | Acceptable |
| 11 | ○ | 91 | Acceptable | $5 \times 10^{13}$ | $1 \times 10^{12}$ | Acceptable |

TABLE 2-continued

| | Solubility | Soldered Area (%) | Corrosion of Copper Plate | Electrical Insulation Resistance | Resistance after the application of voltage | Corrosion after the application of voltage |
|---|---|---|---|---|---|---|
| 12 | ○ | 90 | Acceptable | $3 \times 10^{13}$ | $1 \times 10^{12}$ | Acceptable |
| Comp. Ex. | | | | | | |
| 1 | ○ | 90 | Corrosion Found | $1 \times 10^{9}$ | $1 \times 10^{8}$ | Corrosion Found |
| 2 | X | — | — | — | — | — |
| 3 | ○ | 90 | Acceptable | $5 \times 10^{13}$ | $3 \times 10^{12}$ | Acceptable |

From the above results, it is found that the flux residue according to the examples of the present invention make no corrosive attack on the copper plate, and have an insulation resistance of at least $10^{13}$ Ω, and at least $10^{12}$ Ω as measured after the application of voltage. Evan after the application of voltage, they make no corrosive attack on the copper plate.

In other words, the "flux" of the present invention may be defined as an "at least one flux that provides a flux residue which makes no corrosive attack on a copper plate, has an insulation resistance of at least $10^{13}$ Ω and at least $10^{12}$ Ω after the application of voltage, and makes no corrosive attack on the copper plate even after the application of voltage".

According to the present invention as explained above, there is provided a flux comprising a rosin modified by an unsaturated organic acid according to the Diels-Alder reaction and an aqueous solvent. With this flux, it is possible to reduce the amount of any organic solvent. Especially when a basic agent is used in combination with the flux of the present invention, the flux can easily be perfectly dissolved in water, so that the diffusing of any organic solvent in the air can be substantially reduced, or completely eliminated, either during flux production or during flux coating. This is not only beneficial to workers' health and reducing fire risk, but is also effective for preventing environmental pollution represented by photochemical smog.

Since the rosin modified by the unsaturated organic acid according to the Diels-Alder reaction has an acid number larger than that of the starting rosin, it is possible to dissolve the modified rosin in water in a reduced amount even when the basic agent is used in combination therewith. Any adverse influence on the wettability of molten solder or solderability during soldering can thus be eliminated.

The volatile basic agent, if used, is volatilized off after the flux film has been formed. The flux film, because of being hardly soluble in water, has electrical insulating properties and makes no corrosive attack on the soldering copper foil land, even when it remains on the mounted circuit substrate. Thus, the reliability of the mounted circuit substrate can be well maintained.

It is not required to wash off the flux residue because it has electrical insulating properties and makes no corrosive attack on the soldering land. Omission of the washing step makes productivity higher than that of a conventional washing type flux.

The flux of the present invention, because of being excellent in solderability and making no corrosive attack on the soldering land, can also function effectively as a protecting film for the soldering lands of an unmounted circuit substrate. It is thus possible to provide an unmounted printed circuit substrate having the same functions as a conventional one, the soldering land of which is protected by the protecting film.

The flux of the present invention, because of being excellent in solderability and making no corrosive attack on the soldering land, can also function effectively as a protecting film for the soldering lands of a mounted circuit substrate. It is thus possible to provide a mounted printed circuit substrate having the same functions as a conventional one, the soldering land of which is protected by the protecting film.

The present invention makes it possible to fabricate these unmounted or mounted circuit substrates by a fabrication process in which any organic solvent is not diffused in the air, and so is remarkably effective for prevention of environmental pollution.

We claim:

1. A flux used for soldering electronic parts on a circuit substrate, comprising:
   0.1–30% by weight of a derivative rosin modified by reaction with an unsaturated organic acid according to the Diels-Alder reaction and 70–99.9% by weight of an aqueous solvent, said derivative rosin having an acid number of at least 180.

2. The soldering flux according to claim 1, which further contains a volatile basic agent.

3. The soldering flux according to claim 1, wherein the volatile basic agent is at least one compound selected from the group of ammonia, and an aliphatic amine, a hydrazine, a polyamine, an alkanolamine, a nitrogen atom-containing heterocyclic compound, an alicyclic amine and an aromatic amine represented by the following general formula [I]:

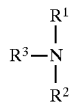

where R1, R2 and R3, which may be identical with or different from each other, stand for a hydrogen atom or an alkyl group.

4. The soldering flux according to claim 2, wherein the volatile basic agent is at least one compound selected from the group of ammonia, and an aliphatic amine, a hydrazine, a polyamine, an alkanolamine, a nitrogen atom-containing heterocyclic compound, an alicyclic amine and an aromatic amine represented by the following general formula [I]:

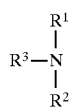

where R1, R2 and R3, which may be identical with or different from each other, stand for a hydrogen atom or an alkyl group.

5. The soldering flux according to claim 3, wherein the volatile basic agent has a boiling point of up to 200° C., and is contained in the soldering flux in an amount of 0.1 to 20% by weight.

6. The soldering flux according to claim 4, wherein the volatile basic agent has a boiling point of up to 200° C., and is contained in the soldering flux in an amount of 0.1 to 20% by weight.

7. The soldering flux according to any one of claims 1, 2 or 6, wherein the aqueous solvent comprises water and a solvent soluble in water, with the amount of water being at least 50% by weight.

8. The soldering flux according to any one of claims 2–6, wherein the aqueous solvent consists of water alone.

* * * * *